United States Patent

Davis et al.

[11] Patent Number: 5,969,503
[45] Date of Patent: Oct. 19, 1999

[54] UNIFIED CONTACTOR CONTROL SYSTEM FOR BATTERY PLANT AND METHOD OF OPERATION THEREOF

[75] Inventors: Roy J. Davis, Rowlett; Marc D. Hirsch, Dallas; Mark A. Johnson, Plano, all of Tex.

[73] Assignee: Lucent Technologies Inc., Murray Hill, N.J.

[21] Appl. No.: 09/005,124

[22] Filed: Jan. 12, 1998

[51] Int. Cl.⁶ .................................................. H02J 7/00
[52] U.S. Cl. ................................. 320/120; 320/118
[58] Field of Search ............................ 320/120, 119, 320/121

[56] References Cited

U.S. PATENT DOCUMENTS

| | | | |
|---|---|---|---|
| 5,047,909 | 9/1991 | Hosoda | 363/40 |
| 5,530,337 | 6/1996 | Yamamoto | 320/138 |
| 5,617,004 | 4/1997 | Kaneko | 320/119 |
| 5,729,117 | 3/1998 | Fukuda | 320/117 |
| 5,815,389 | 9/1998 | Plow et al. | 320/134 |

*Primary Examiner*—Peter S. Wong
*Assistant Examiner*—Lawrence Luk

[57] ABSTRACT

A central contactor controller for a battery plant containing a power supply couplable to a source of AC power and a battery via a bus, the bus further couplable to a load to supply power thereto, and a method of operation thereof. In one embodiment, the controller includes: (1) a sensor that senses operational states of the power supply and the battery and (2) central control circuitry, coupled to the sensor and couplable to distributed contactors associated with the battery and the load, that provide control information to distributed control circuitry associated with the distributed contactors in response to the operational states, the distributed control circuitry employing the control information to control the distributed contactors selectively to couple the battery and the load to the bus.

20 Claims, 2 Drawing Sheets

UNIFIED CONTACTOR CONTROL SYSTEM FOR BATTERY PLANT AND METHOD OF OPERATION THEREOF

TECHNICAL FIELD OF THE INVENTION

The present invention is directed, in general, to battery backed-up power systems and, more specifically, to a contactor control system for a battery plant that unifies control of various contactors in the battery plant to improve operation thereof.

BACKGROUND OF THE INVENTION

Many large and medium size telecommunication battery plants supply power to switching equipment loads connected through plant load contactors. These contactors may be controlled by an external board or module outside of the plant controller. Other systems may have the load contactors directly controlled by an office plant controller. In each of these implementations, not is enough information is presently utilized to effectively control the load disconnect function. One of the main purposes of a load disconnect contactor is to remove the attached load from the power bus when the plant bus voltage is deemed to be at some hazardous level to some of the power equipment components (typically, a low voltage level). For example, at low voltage levels, the attached equipment may generate excessive current drains which may permanently damage the equipment. Present load disconnect designs exhibit a load contactor chattering problem, a situation where the load contactor rapidly turns on and off due to system conditions. Load chattering can lower the life of the contactor, create unnecessary noise, and disrupt or damage attached equipment.

Chattering contactors can be produced by a variety of different plant scenarios, one of them being a total AC failure or an AC phase failure. These types of power failures to the plant will cause the power equipment to run on batteries. The battery in a discharge mode of operation will eventually lower the plant bus voltage all the way down below a designated load disconnect threshold value. After reaching the threshold value, the load is disconnected. After the load is disconnected, the plant bus voltage increases to a value above the disconnect threshold value, which may be above a preset contactor reconnect value, provided one exists. This allows the controlling contactor device to place the load back onto the bus which immediately drags the bus voltage down below the disconnect value (since the backup batteries have already been drained of capacity), hence load contactor chattering occurs. There are other situations which may occur that can cause a rectifier or a number of rectifiers to fail or stop producing power. Under these circumstances and under certain load conditions, chattering contactors may also result.

In the past, one circuit pack or module was used to make the decision to disconnect or reconnect the load contactor. While this system is relatively reliable, the decision was made without the consideration of any additional plant status information which would allow for a more proficient decision.

Accordingly, what is needed in the art is a contactor controller containing a disconnect and reconnect feature which utilizes not only standard equipment information, but also other sources of plant-wide information.

SUMMARY OF THE INVENTION

To address the above-discussed deficiencies of the prior art, the present invention provides a central contactor controller for a battery plant containing a power supply couplable to a source of AC power and a battery via a bus, the bus further couplable to a load to supply power thereto, and a method of operation thereof. In one embodiment, the controller includes: (1) a sensor that senses operational states of the power supply and the battery and (2) central control circuitry, coupled to the sensor and couplable to distributed contactors associated with the battery and the load, that provide control information to distributed control circuitry associated with the distributed contactors in response to the operational states, the distributed control circuitry employing the control information to control the distributed contactors selectively to couple the battery and the load to the bus.

The present invention therefore introduces the broad concept of controlling the various distributed contactors in a battery plant with a view toward the overall state of the plant, rather than a local, perhaps deceptive, view. In doing so, the present invention avoids conditions that give rise to chattering or other, possibly more destructive, occurrences.

In one embodiment of the present invention, the power supply comprises at least one rectifier. The rectifiers may be coupled in electrical parallel to charge the battery, power the load or both.

In one embodiment of the present invention, the battery is series-coupled to a second battery to form a battery string. Those skilled in the art are familiar with battery strings and their use in conventional battery plants.

In one embodiment of the present invention, the controller further comprises an AC power sensor that detects a quality of the AC power. "Quality" may be a presence or absence of the AC power or any phase thereof, a voltage or current level of the AC power, or transients, spikes, noise or other disturbance in the AC power waveform.

In one embodiment of the present invention, the sensor detects a voltage of the bus. In a related embodiment, the power supply comprises a plurality of power supply modules coupled in parallel, the controller detecting the operational state of each of the plurality of power supply modules. Even if bus voltage is normal, it may be disadvantageous to add load to the bus if insufficient redundancy or capacity exists with respect to the power supply modules.

In one embodiment of the present invention, the load comprises telecommunications equipment. Those skilled in the art will readily understand, however, that the principles of the present invention can be applied to battery plants that supply power to other types of equipment.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
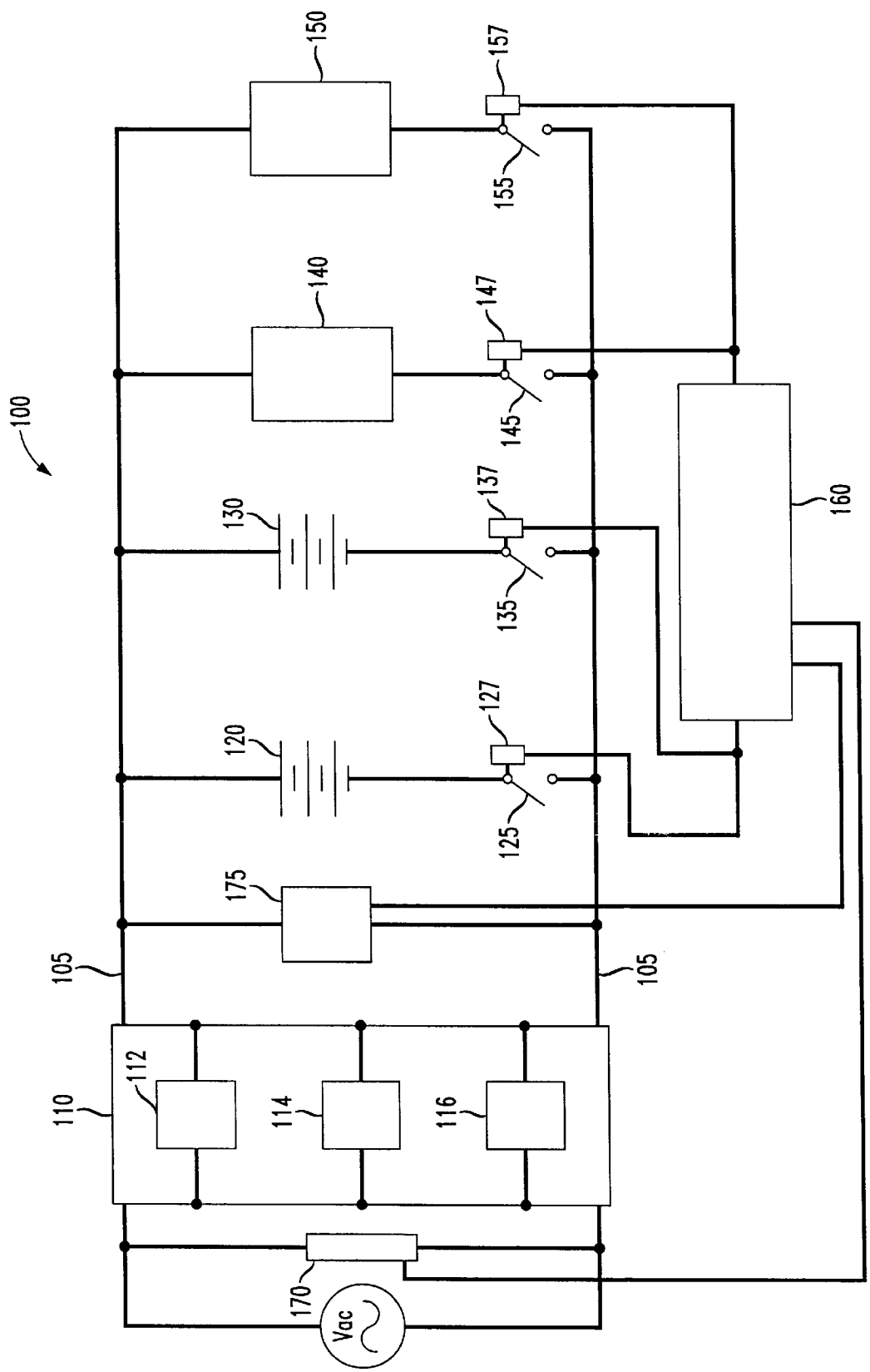
FIG. 1 illustrates a schematic diagram of an embodiment of a battery plant constructed according to the principles of the present invention.

Referring initially to FIG. 1, illustrated is a schematic diagram of an embodiment of a battery plant 100 constructed according to the principles of the present invention. The battery plant 100 includes a power supply 110 coupled to a source of AC power Vac. The power supply 110 includes a plurality of power supply modules 112, 114, 116 that, in one embodiment, may be rectifier modules. The power supply 110 provides power to a first and second load (e.g., telecommunications equipment) 140, 150 via a bus (collectively designated 105). Further, back-up battery strings 120, 130 are coupled in parallel across the loads 140, 150. Each battery string 120, 130 consists of numerous batteries coupled in series to form the string. Additionally, each battery string 120, 130 and each load 140, 150 is coupled to a first, second, third and fourth contactor 125, 135, 145, 155, respectively, capable of disconnecting the respective battery string or load from the supplied DC voltage. The first, second, third and fourth contactor 125, 135, 145, 155 each include control circuitry 127, 137, 147, 157 capable of responding to control signals and local manual input to control the respective contactors 125, 135, 145, 155. A central contactor controller 160 is coupled to each contactor 125, 135, 145, 155, via the control circuitry 127, 137, 147, 157, allowing control signals to be issued to the various contactors 125, 135, 145, 155. The contactors 125, 135, 145, 155 are capable of functioning either under a predesigned program or manually if it is disconnected from the central contactor controller 160. An AC power sensor 170 is coupled across the source of AC power Vac. The AC power sensor is employed to detect the quality of the supplied AC power. Finally, a DC voltage sensor 175 is coupled across the bus 105 to sense the bus voltage. While a single voltage sensor 175 is illustrated across the bus 105, those skilled in the art understand that a sensor may be employed with each power module 112, 114, 116.

In the normal operation of the system, all of the contactors 125, 135, 145, 155 are closed, connecting the equipment loads 140, 150 to the DC voltage supplied by the bus 105. Should the bus voltage falling below a set threshold for any reason, the battery strings 120, 130 will supply DC voltage to the loads 140, 150. With the battery strings 120, 130 in discharge mode, the bus voltage again gradually drops below the set threshold voltage. Once the bus voltage drops below the threshold, the central contactor controller 160 disconnects the third and fourth contactors 145, 155 to avoid damaging the equipment loads 140, 150. The first and second contactors 125, 135 will disconnect the battery strings 120, 130 after the loads 140, 150 should it be necessary to protect the battery strings 120, 130 from being damaged due to extreme power drainage.

Figure 2:
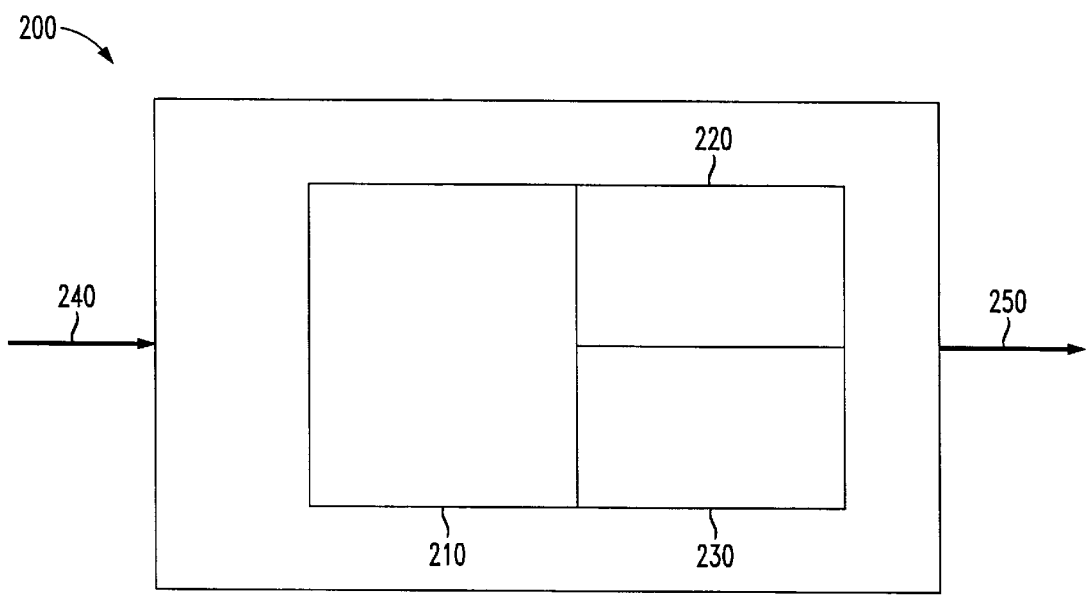
FIG. 2 illustrates an expanded view of an embodiment of central control circuitry constructed according to principles of the present invention.

Turning now to FIG. 2, illustrated is an expanded view of an embodiment of central control circuitry 200 constructed according to principles of the present invention. The central contactor controller 200 comprises a microprocessor 210 with associated memory 220 and data storage 230 capable of accepting various plant state data input signals 240 and capable of providing output signals 250 used to control the assorted plant load and battery string contactors. The input signals 240 are relayed to the controller 200 from sensors which monitor plant power supplies, including, without limitation, power bus voltage, battery string voltage and AC supply voltage and the operational state of each of the rectifiers or power supply modules.

It should be noted that any conventional computer system having at least one processor that is suitable to function as a general purpose computer may replace, or be used in conjunction with, the controller 200. Alternative computer system embodiments may be firmware-or hardware-based.

In addition to various plant voltages sensor readings, the controller 200 receives various input signals detailing various plant operational states. Typical examples of possible inputs include:

MACF1—Multiple AC failures reported to the controller by two or more rectifiers. MACF1 could be a result of multiple AC input phase failure or a single phase causing more than one rectifier to detect and report an AC failure. This alarm indicates that the plant may have less rectifiers than necessary to keep the plant operational, and some other form of power generation is presently being utilized.

MFA1—The plant controller has detected failures in two or more rectifiers. Various internal conditions specific to each type of rectifier can create a rectifier failure alarm. Once detected, this alarm is sent to the controller by the rectifier.

MAN1—A rectifier has been placed into a local manual standby mode, whereby, its output delivering capabilities have been turned off. This is typically done by switching the rectifier into an off or standby mode.

BDA1—The plant controller has determined that the plant voltage is below a defined or default threshold voltage. This alarm indicates that the plant is in a battery-on-discharge mode.

The controller 200 employs an algorithm that prevents chattering from occurring, by evaluating the variables that represent the states of various plant components. The controller 200 verifies the states of the MACF1, MFA1, MAN1, or BDA1 alarm inputs. The MACF1 condition is asserted if either the AC input to the plant has been shut off or removed, two or more AC input circuit breakers to each of the rectifiers had been tripped, or the level of the AC input that powers two or more of the rectifiers are determined to be out of the desired operating range of the switching power supply. In any case, the rectifier redundancy of the plant has been jeopardized, and the plant is being overloaded, so the controller 200 does not allow the disconnected load to be reconnected to the bus even if the bus voltage appears to be at a sufficient voltage level.

MFA1 functions in a fashion similar MACF1. Detecting an MFA1 condition normally means that the plant controller has determined that two or more rectifiers have provided an indication that they have failed. This failure was detected internally by the suspect rectifiers or by the controller 200 because it was unable to communicate to the suspect rectifiers. Again, the rectifier redundancy of the system has been jeopardized and the plant is being overloaded so the algorithm does not allow the disconnected load to be reconnected to the plant bus.

The MAN1 condition is asserted only when a user physically switches the rectifier to place it in a disabled output power supplying capability mode. It is assumed that the user desires all rectifiers to operate when the battery plant is in normal mode of operation whereby any turning off of rectifiers is done by the plant controller 200 and can be turned back on. Having a rectifier manually turned off decreases total plant capacity. In this case, the controller 200 does not allow the disconnected loads to be reconnected.

Finally, BDA1 indicates that some plant condition has lowered the plant bus voltage below its normal operating state. The disconnect thresholds are set below the battery-on-discharge threshold. Thus, if a BDA1 condition still exists, the plant controller 200 does not reconnect any disconnected loads. BDA1 provides a relatively safe plant voltage minimum level to reconnect any disconnected loads. In the cases where the contactor reconnect level thresholds fall between the contactor disconnect voltage level and the plant controller's battery-on-discharge level, the controller 200 does not allow the loads to be reconnected until the BDA1 condition has disappeared. The BDA1 alarm threshold level is typically set at a voltage level that allows a plant recovering from a draining of its batteries to provide enough charge back into the batteries at a higher rate. At this voltage level, a properly designed plant can supply power to a full equipment load and provide the necessary charge current for the depleted battery strings. The BDA1 alarm is used in this implementation because it is a built-in test for battery voltage that is high enough to reconnect the batteries.

Therefore, based upon the existence of any of the above alarms, disconnected load contactors are not reconnected. If the plant begins to recover and all of the conditions causing these alarms have retired as determined by the controller 200, the disconnected load contactors are reconnected to the battery plant bus after a specified delay time. The delay time provides an interval for a build-up to full load capacity of the plant's rectifiers.

Figure 3:
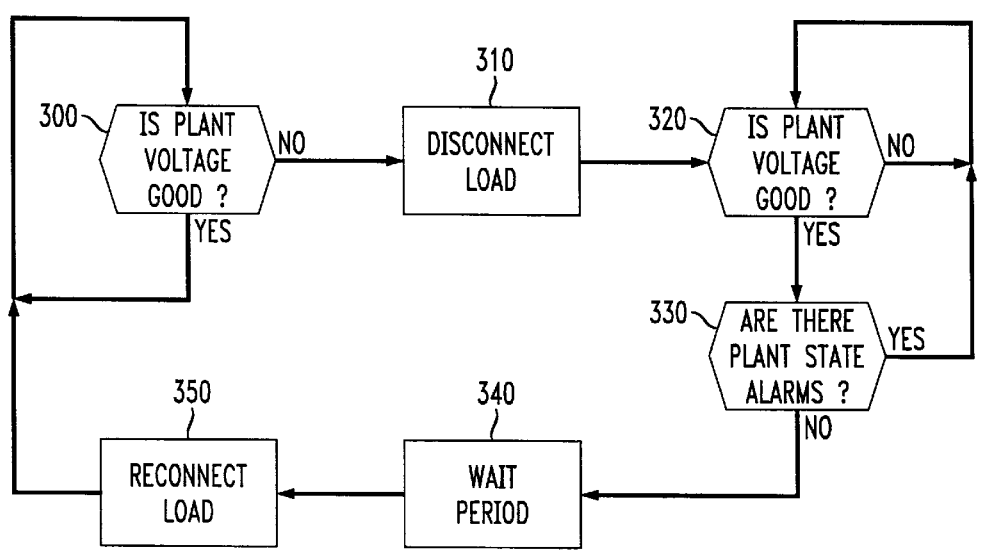
FIG. 3 illustrates a flow diagram of an embodiment of a method of operating a central contactor controller.

Turning now to FIG. 3, illustrated is a flow diagram of an embodiment of a method of operating a central contactor controller. With continuing reference to FIGS. 2 and 3, the controller operates as follows. The operation begins with the first plant voltage sampling step 300, obtained from sensor inputs. Again, this reading includes, for instance, the voltages from the power supply or rectifiers, the quality of the AC power, the power bus voltage and the battery string voltages.

If the plant voltage is determined to be at a specified voltage or above, this step is repeated. Should the plant voltage be determined to be below the specified level, the controller proceeds to a load disconnect step 310, where the controller signals the load contactors to open, removing the specified load from the power bus.

The next step after the load disconnect step 310 is a second plant voltage sampling step 320. At this decisional step, the plant voltage is once again obtained and compared to a specified voltage value. If the plant voltage is lower than the specified value, the step is repeated. If the value is greater than the specified value, the controller proceeds to the plant state alarms step 330. In this step, the controller ascertains if there are other plant state inputs which require the loads to remain disconnected. If there are positive alarm inputs, the controller returns to the second plant voltage sampling step 320 and resamples the plant voltage.

If there are no plant alarms, the controller proceeds to the wait period step 330. This wait period is user specified and provides an interval for a build-up to full load capacity of the plant's rectifiers. Following the wait period, the controller, at the load reconnect step 340, reconnects the specified load to the power bus by signaling the respective contactors to close. After reconnect, the cycle begins once again with a plant voltage sampling during the first plant voltage sampling step 300. Where there are multiple loads, the controller will designate specific loads to be connected or reconnected according to user specified protocols.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993) and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

Although the present invention has been described in detail, those skilled in the art should understand that they can make various changes, substitutions and alterations herein without departing from the spirit and scope of the invention in its broadest form.

What is claimed is:

1. A central contactor controller for a battery plant containing a power supply couplable to a source of AC power and a battery via a bus, said bus further couplable to a load to supply power thereto, said controller comprising:

a sensor that senses operational states of said power supply and said battery; and central control circuitry, coupled to said sensor and couplable to distributed contactors associated with said battery and said load, that provide control information to distributed control circuitry associated with said distributed contactors in response to said operational states, said distributed control circuitry employing said control information to control said distributed contactors selectively to couple said battery and said load to said bus.

2. The controller as recited in claim 1 wherein said power supply comprises at least one rectifier.

3. The controller as recited in claim 1 wherein said battery is series-coupled to a second battery to form a battery string.

4. The controller as recited in claim 1 further comprising an AC power sensor that detects a quality of said AC power.

5. The controller as recited in claim 1 wherein said sensor detects a voltage of said bus.

6. The controller as recited in claim 1 wherein said power supply comprises a plurality of power supply modules coupled in parallel, said controller detecting said operational state of each of said plurality of power supply modules.

7. The controller as recited in claim 1 wherein said load comprises telecommunications equipment.

8. A method of operating a central contactor controller for a battery plant containing a power supply couplable to a source of AC power and a battery via a bus, said bus further couplable to a load to supply power thereto, said method comprising the steps of:

sensing operational states of said power supply and said battery with a sensor; and providing, with central control circuitry coupled to said sensor and couplable to distributed contactors associated with said battery and said load, control information to distributed control circuitry associated with said distributed contactors in response to said operational states, said distributed control circuitry employing said control information to control said distributed contactors selectively to couple said battery and said load to said bus.

9. The method as recited in claim 8 wherein said power supply comprises at least one rectifier.

10. The method as recited in claim 8 wherein said battery is series-coupled to a second battery to form a battery string.

11. The method as recited in claim 8 further comprising the step of detecting a quality of said AC power.

12. The method as recited in claim 8 wherein said step of sensing comprises the step of detecting a voltage of said bus.

13. The method as recited in claim 8 wherein said power supply comprises a plurality of power supply modules coupled in parallel, said step of sensing comprising, the step of detecting said operational state of each of said plurality of power supply modules.

14. The method as recited in claim 8 wherein said load comprises telecommunications equipment.

15. A battery plant, comprising:
   a plurality of rectifiers couplable to a source of AC power;
   a bus coupled to said plurality of rectifiers and further couplable to a load via a first distributed contactor to supply power thereto;
   a battery couplable to said bus via a second distributed contactor; and
   a central contactor controller, including:
      a sensor that senses operational states of said plurality of rectifiers and said battery, and
      central control circuitry, coupled to said sensor and couplable to said first and second distributed contactors, that provide control information to first and second distributed control circuitry associated with said first and second distributed contactors in response to said operational states, said first and second distributed control circuitry employing said control information to control said first and second distributed contactors selectively to couple said battery and said load to said bus.

16. The battery plant as recited in claim 15 wherein said battery is series-coupled to a second battery to form a battery string.

17. The battery plant as recited in claim 15 further comprising an AC power sensor that detects a quality of said AC power.

18. The battery plant as recited in claim 15 wherein said sensor detects a voltage of said bus.

19. The battery plant as recited in claim 15 wherein said controller detects said operational state of each of said plurality of rectifiers modules.

20. The battery plant as recited in claim 15 wherein said load comprises telecommunications equipment.

* * * * *